(12) United States Patent
Ishii

(10) Patent No.: US 11,425,297 B2
(45) Date of Patent: Aug. 23, 2022

(54) IMAGE CAPTURING APPARATUS AND CONTROL METHOD THEREOF

(71) Applicant: CANON KABUSHIKI KAISHA, Tokyo (JP)

(72) Inventor: Hirokazu Ishii, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/206,341

(22) Filed: Mar. 19, 2021

(65) Prior Publication Data

US 2021/0211572 A1 Jul. 8, 2021

Related U.S. Application Data

(63) Continuation of application No. 16/398,434, filed on Apr. 30, 2019, now Pat. No. 10,986,261.

(30) Foreign Application Priority Data

May 10, 2018 (JP) .............................. JP2018-091405

(51) Int. Cl.
*H04N 5/232* (2006.01)
*H04N 5/235* (2006.01)

(52) U.S. Cl.
CPC ....... *H04N 5/23212* (2013.01); *H04N 5/2353* (2013.01)

(58) Field of Classification Search
None
See application file for complete search history.

(56) References Cited

U.S. PATENT DOCUMENTS

| | | | |
|---|---|---|---|
| 8,611,738 B2 | 12/2013 | Ishii | |
| 10,116,857 B2 | 10/2018 | Iwasaki | |
| 10,200,595 B2 | 2/2019 | Kimoto | |
| 10,986,261 B2 * | 4/2021 | Ishii | ..................... H04N 5/2351 |
| 2012/0038810 A1 | 2/2012 | Taniguchi | |
| 2012/0300116 A1 | 11/2012 | Nakamoto | |
| 2016/0205309 A1 | 7/2016 | Hamano | |
| 2016/0373655 A1 | 12/2016 | Kobayashi et al. | |

FOREIGN PATENT DOCUMENTS

| | | |
|---|---|---|
| JP | 2010-219958 A | 9/2010 |
| JP | 2015-144346 A | 8/2015 |
| JP | 2018-037959 A | 3/2018 |
| JP | 2018-045102 A | 3/2018 |

OTHER PUBLICATIONS

Office Action dated Nov. 15, 2021, in Japanese Patent Application No. 2018-091405.

* cited by examiner

*Primary Examiner* — Mark T Monk

(74) *Attorney, Agent, or Firm* — Venable LLP

(57) ABSTRACT

An image capturing apparatus comprising: an image sensor that includes a plurality of focus detection pixels capable of outputting a pair of signals to be used for focus detection; a setter that sets an exposure control value based on a result of photometry; a controller that controls to perform image shooting by controlling exposure based on the exposure control value set by the setter; a detector that detects a focus state based on the pair of signals read out from the plurality of focus detecting pixels under control of the controller; and an estimator that estimates reliability of the focus state detected by the detector by normalizing an evaluation value obtained at a time of detecting the focus state by the detector in a case where the image shooting is performed using the exposure control value set by the setter.

20 Claims, 14 Drawing Sheets

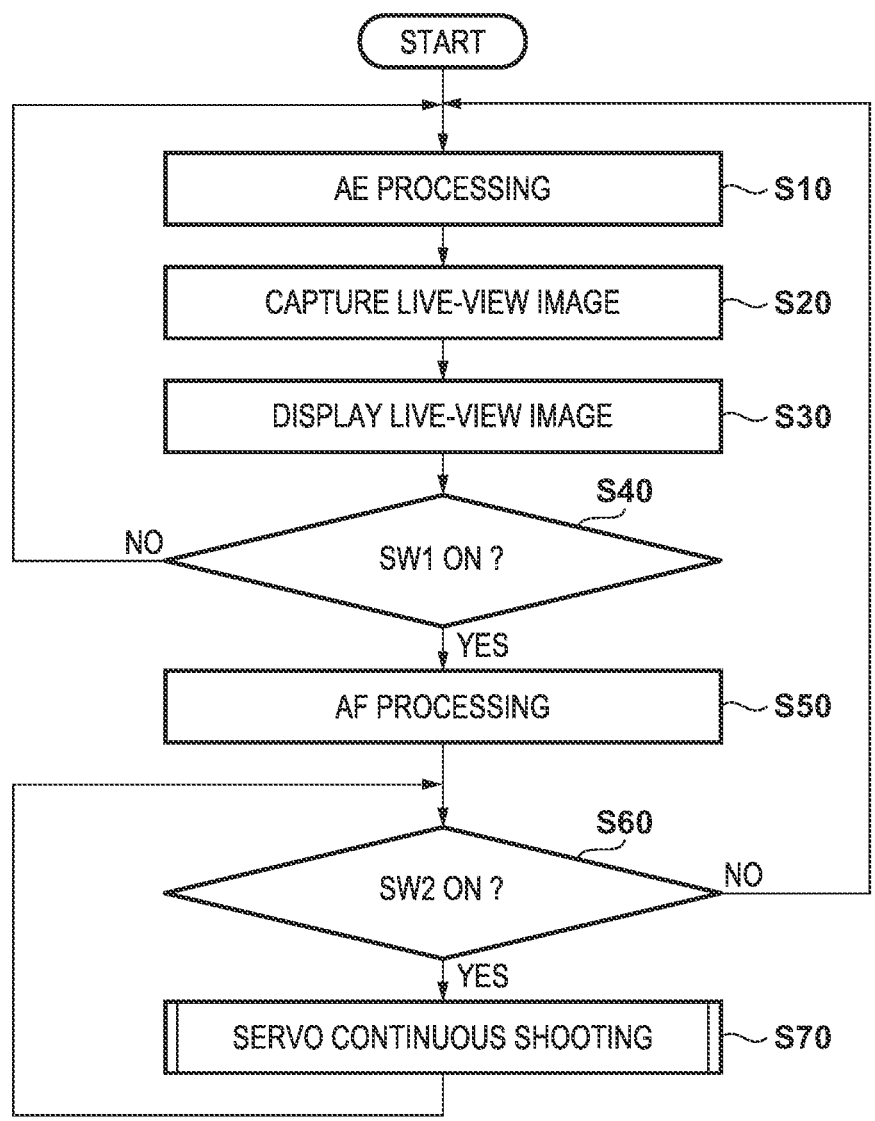

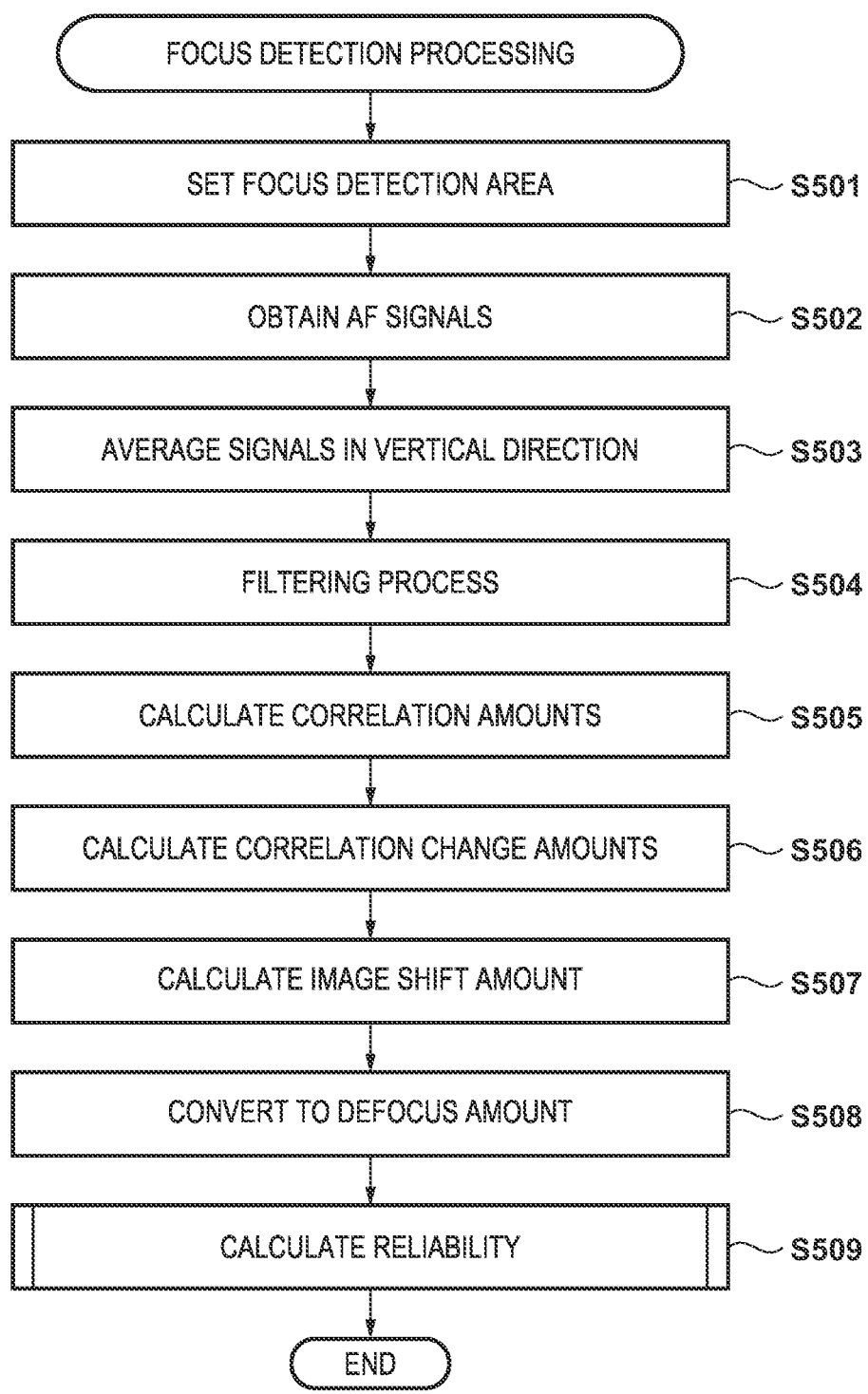

IMAGE CAPTURING APPARATUS AND CONTROL METHOD THEREOF

This is a continuation of U.S. patent application Ser. No. 16/398,434, filed Apr. 30, 2019.

BACKGROUND OF THE INVENTION

Field of the Invention

The present invention relates to an image capturing apparatus and a control method thereof.

Description of the Related Art

In an image capturing apparatus, a technique of enabling to obtain a defocus amount of an imaging lens by incorporating a phase difference detection function into an image sensor has been proposed.

For example, in the image sensor described in Japanese Patent Laid-Open No. 2010-219958, in a part of the light receiving elements, the sensitivity region of the light receiving portion is decentered with respect to the optical axis of the on-chip microlens. The phase difference detection function is realized by arranging the pixels having these light receiving elements at predetermined intervals in the image sensor. The on-imaging plane phase difference AF that uses this phase difference detection function is an AF method suitable for high-speed focusing (AF) because a defocus amount is detected and thus the target position for driving the lens can be directly detected.

On the other hand, in an AF continuous shooting function in which continuous shooting is performed while focusing on a subject using an AF function, high-speed AF is a very useful function when performing continuous shooting of a moving subject. In the image capturing apparatus described in Japanese Patent Laid-Open 2015-144346, when image shooting is performed using the AF continuous shooting function, still image shooting in which signals of all pixels are read out from the image sensor, and live view shooting in which signals are read at low resolution at high speed for AF and to follow the subject are alternately performed. Further, Japanese Patent Laid-Open No. 2015-144346 discloses a technique of alternately displaying still images and images obtained in live view shooting, thereby improving the framing followability.

In the technique described in Japanese Patent Laid-Open No. 2015-144346, in still image shooting, exposure suitable for still image shooting is often set in consideration of shutter speed that is set in consideration of camera shake and depth of field. On the other hand, in live view shooting, exposure is often controlled for enhancing moving object tracking performance by setting the exposure suitable for low-resolution reading for object tracking and giving priority mainly to the accuracy of AF.

However, the quality of the continuously displayed live view image is very sensitive to the exposure change, and a slight luminance difference or aperture change may greatly affect the flicker or the like of the live view image. Usually, since there are many cases where the optimum exposure setting conditions are different between still image shooting conditions and the shooting conditions suitable for AF, alternating display between still images and images obtained by live view shooting as in Japanese Patent Laid-Open No. 2015-144346 is a cause of flicker of the live view image. In particular, when the aperture is changed, the change of blur is alternately observed in an out-of-focus area other than the main subject, and therefore, a large flicker of the live view image is observed.

SUMMARY OF THE INVENTION

The present invention has been made in consideration of the above situation, and achieves both a high image quality of a live view image and high accuracy of focus detection in a case of shooting still images continuously.

According to the present invention, provided is an image capturing apparatus comprising one or more processors and/or circuitry which functions as: an image sensor that includes a plurality of focus detection pixels capable of outputting a pair of signals having parallax based on light fluxes that have passed through different pupil regions of an imaging optical system; a setter that sets an exposure control value based on a result of photometry; a controller that controls to perform image shooting by controlling exposure based on the exposure control value set by the setter; a detector that detects a focus state based on the pair of signals read out from the plurality of focus detecting pixels under control of the controller; and an estimator that estimates reliability of the focus state detected by the detector by normalizing an evaluation value obtained at a time of detecting the focus state by the detector in a case where the image shooting is performed using the exposure control value set by the setter.

Further, according to the present invention, provided is a control method of an image capturing apparatus having an image sensor that includes a plurality of focus detection pixels capable of outputting a pair of signals having parallax based on light fluxes that have passed through different pupil regions of an imaging optical system, the method comprising: setting an exposure control value based on a result of photometry; controlling to perform image shooting by controlling exposure based on the exposure control value set by the setter; detecting a focus state based on the pair of signals read out from the plurality of focus detecting pixels under the control; and estimating reliability of the detected focus state by normalizing an evaluation value obtained at a time of detecting the focus state in a case where the image shooting is performed using the set exposure control value.

Furthermore, according to the present invention, provided is a non-transitory storage medium readable by a computer, the storage medium storing a program that is executable by the computer, wherein the program includes program code for causing the computer to execute a control method of an image capturing apparatus having an image sensor that includes a plurality of focus detection pixels capable of outputting a pair of signals having parallax based on light fluxes that have passed through different pupil regions of an imaging optical system, the method comprising: setting an exposure control value based on a result of photometry; controlling to perform image shooting by controlling exposure based on the exposure control value set by the setter; detecting a focus state based on the pair of signals read out from the plurality of focus detecting pixels under the control; and estimating reliability of the detected focus state by normalizing an evaluation value obtained at a time of detecting the focus state in a case where the image shooting is performed using the set exposure control value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart showing a flow of an overall processing of the image capturing apparatus according to the embodiment;

FIG. 4 is a flowchart illustrating focus detection processing according to the embodiment;

DESCRIPTION OF THE EMBODIMENTS

Exemplary embodiments of the present invention will be described in detail in accordance with the accompanying drawings.

Figure 1:
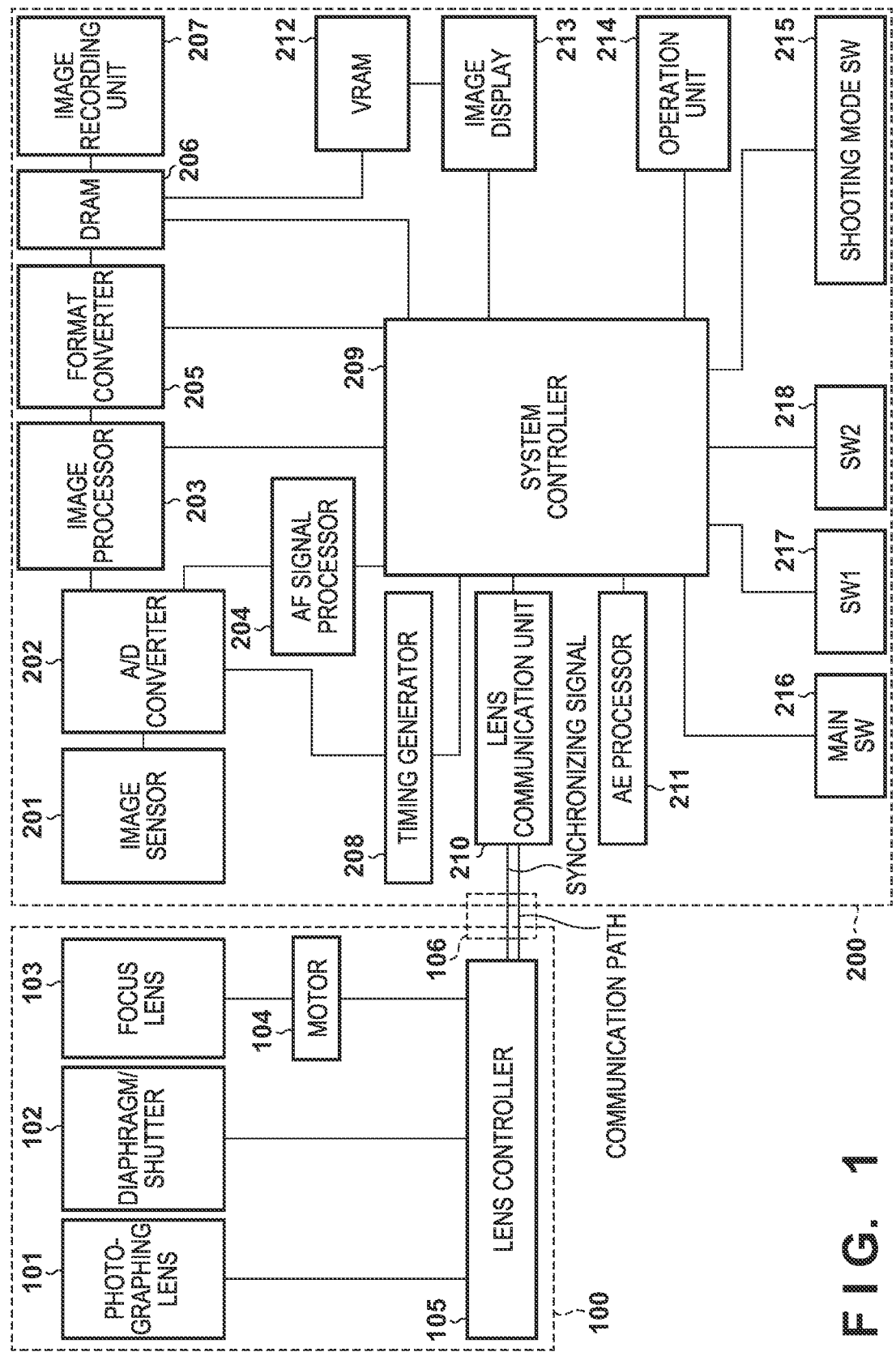
FIG. 1 is a block diagram showing a configuration of an image capturing apparatus according to an embodiment of the present invention.

FIG. 1 is a block diagram showing the configuration of an electronic camera as an image capturing apparatus to which the present invention is applied. As shown in FIG. 1, a lens apparatus 100 (interchangeable lens) is detachably (removably) attached to a digital camera main body 200 via a mount (not shown) having an electric contact unit 106.

The lens apparatus 100 includes a photographing lens 101 including a zoom mechanism, a diaphragm/shutter 102 for controlling an amount of light, a focus lens 103, a motor 104 for driving the focus lens 103, and a lens controller 105.

In the digital camera main body 200, an image sensor 201 is configured using a CCD, a CMOS sensor, or the like, receives light that is reflected from a subject and has passed through the photographing optical system of the lens apparatus 100, converts the light into signal charges corresponding to an amount of incident light by photodiodes, and accumulate the signal charge. The signal charges accumulated in the respective photodiodes are sequentially read out from the image sensor 201 as voltage signals corresponding to the signal charges in response to a drive pulse supplied from a timing generator 208 in accordance with an instruction from a system controller 209.

An A/D converter 202 performs A/D conversion on the voltage signals output from the image sensor 201. The A/D converter 202 includes a CDS circuit that removes the output noise of the image sensor 201 and a non-linear amplification circuit that is performed before A/D conversion.

The digital camera main body 200 further includes an image processor 203, an AF signal processor 204, a format converter 205, and a high-speed built-in memory 206 (hereinafter referred to as "DRAM") such as a random access memory. The DRAM 206 is used as a high speed buffer for temporarily storing an image, or as a working memory for performing image compression/decompression. An image recording unit 207 includes a removable recording medium such as a memory card and an interface therefor.

The system controller 209 controls the entire image capturing apparatus such as a shooting sequence. The digital camera main body 200 further includes a lens communication unit 210 that communicates between the digital camera main body 200 and the lens apparatus 100, an AE processor 211, and an image display memory 212 (VRAM). The image display 213 displays an operation assistance display and a camera state display as well as an image display, and displays an imaging screen and a focus detection area when performing shooting.

In addition, the digital camera main body 200 has various operation members for the user to operate the image capturing apparatus. An operation unit 214 includes, for example, a menu switch for performing various settings such as settings of a shooting function of an image capturing apparatus and settings at the time of playing back an image, an operation mode changeover switch for switching between a shooting mode and a playback mode, and so forth. A shooting mode switch 215 is a switch for selecting a shooting mode such as a macro mode, a sport mode, or a servo continuous shooting mode, and a main switch 216 is a switch for turning on the image capturing apparatus. A shooting preparation switch 217 (hereinafter referred to as "SW1") is a switch for instructing shooting preparation operations such as automatic focusing (AF) and automatic exposure control (AE), and is turned on when it is half-pressed, for example. A shooting switch 218 (hereinafter referred to as "SW2") is a switch for instructing shooting, and is turned on when it is full-pressed, for example, sequentially after the operation of the SW1 (217).

Configuration of Image Sensor and Readout Method

Figure 2:
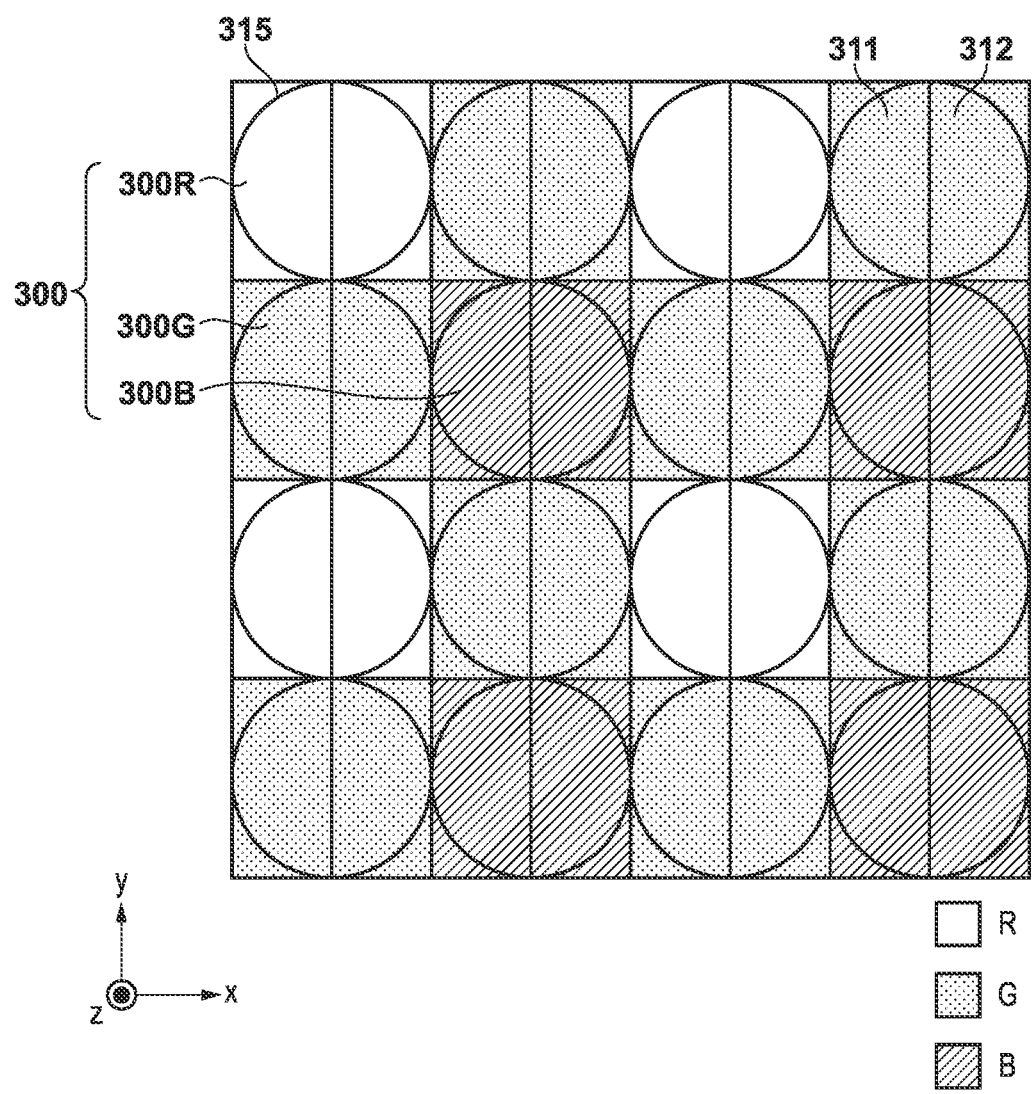
FIG. 2 is a schematic view of a pixel array of an image sensor according to the embodiment.

FIG. 2 shows a schematic view of a pixel array of the image sensor 201 in the present embodiment. In FIG. 2, a pixel array of a two-dimensional CMOS sensor used as the image sensor 201 in the present embodiment is shown in a range of four columns×four rows of image capturing pixels (a range of eight columns×four rows as an array of focus detection pixels).

In the present embodiment, a pixel group 300 includes two columns×two rows of pixels, and is covered by a Bayer array color filter. In each pixel group 300, a pixel 300R having spectral sensitivity to red (R) is positioned at the upper left, pixels 300G having spectral sensitivity to green (G) are positioned at the upper right and the lower left, and a pixel 300B having spectral sensitivity to blue (B) is positioned at the lower right. Further, in the image sensor 201 of the present embodiment, in order to perform focus detection by an on-imaging plane phase difference method, each pixel holds a plurality of photodiodes (photoelectric converters) for one microlens 315. In the present embodiment, each pixel is configured with two photodiodes 311 and 312 arranged in two columns×one row.

By having many pixel groups 300, each including two columns×two rows of pixels (four columns×two rows of photodiodes) shown in FIG. 2, arranged on the imaging plane, the image sensor 201 is enabled to obtain image signals and focus detection signals.

In each pixel having this sort of configuration, luminous fluxes that have passed through different pupil regions are separated by the microlens 315 and formed as an image on the photodiodes 311 and 312. A signal (A+B signal) obtained by adding signals from the two photodiodes 311 and 312 is used as an image signal, and two signals (A signal and B signal) respectively read out from the individual photodiodes 311 and 312 are used as focus detection signals. Note that the image signal and the focus detection signals may be respectively read out, but in the present embodiment, in consideration of processing load, signals may be obtained as follows. That is, the image signal (A+B signal), and a focus detection signal from either one of the photodiodes 311 and 312 (for example, the A signal), are read out, and by taking the difference between those signals, the other focus detection signal (for example, the B signal) is obtained.

Note that in the present embodiment, a configuration is adopted in which in each pixel, there are the two photodiodes 311 and 312 for the one microlens 315, but the number of photodiodes is not limited to two, and a configuration may also be adopted in which the number of photodiodes is three or more. Also, the pupil division direction is not limited to the horizontal direction, and may be the vertical direction. Further, a configuration may be adopted in which there are a plurality of pixels having a different opening position of a light receiving portion with respect to the microlens 315. That is, any configuration may be used as long as two signals for phase difference detection, such as an A signal and a B signal, can be obtained as a result. Also, the present invention is not limited to a configuration in which, as shown in FIG. 2, all pixels have a plurality of photodiodes; a configuration may also be adopted in which focus detection pixels as shown in FIG. 2 are discretely provided within normal pixels included in the image sensor 201. In addition, a plurality of types of pixels divided by different division methods may be included in the same image sensor.

The image signal and the focus detection signals (A signal or B signal) read out from the image sensor 201 are input to the A/D converter 202, and subjected to correlated double sampling to remove reset noise, gain adjustment, and signal digitization. Then, the A/D converter 202 outputs the image signal to the image processor 203, and the image signal and the focus detection signals (A signal or B signal) to the AF signal processor 204.

The AF signal processor 204 obtains the other focus detection signals (B signal or A signal) from the image signal and focus detection signal (A signal or B signal) output from the A/D converter 202. Then, by adding a plurality of A signals and a plurality of B signals corresponding to a plurality of pixels in a direction orthogonal to the pupil division direction, respectively, whereby a pair of image signals (A image signal, B image signal) used for AF by on-imaging plane phase difference method (referred to as "on-imaging plane phase difference AF", hereinafter) is obtained. Then, correlation calculation is performed using the obtained pair of image signals, and a phase difference (hereinafter referred to as "image shift amount") which is a shift amount of the pair of image signals is calculated, and the image shift amount and reliability are calculated. Then, information of the calculated image shift amount and reliability is output to the system controller 209. The details of the correlation calculation and the reliability calculation method will be described later with reference to FIGS. 5A to 8C.

As a method of reading out pixel signals in the present embodiment, it is possible to appropriately select any of an all-pixel reading method of reading all pixels, a vertical thinning method, a horizontal addition method, a vertical thinning and horizontal addition method, and the like. Note that the vertical thinning method is a reading method in which pixels are thinned out in the vertical direction when signals are read out, the horizontal addition method is a reading method in which pixels are added in the horizontal direction when signals are read out, and the vertical thinning and horizontal addition method is a reading method in which pixels are thinned out in the vertical direction and pixels are added in the horizontal direction when signals are read out.

In this embodiment, the all-pixel reading method is adopted when reading a still image. In this method, image signals are read out from all the pixels of the image sensor.

On the other hand, in the all-pixel reading method, only a limited number of images can be acquired within a predetermined time period because the number of pixels to be read out is large. Therefore, in a case where a subject is a moving subject and moving at high speed, it becomes difficult to capture the subject accurately within the angle of view. Therefore, in the present embodiment, at the time of live view shooting, one of the vertical thinning method, the horizontal addition method, and the vertical thinning and horizontal addition method is adopted. Since the number of pixels to be read out is smaller than at the time of shooting a still image, these methods are suitable for speeding up processing.

Operation

Next, the operation in the image capturing apparatus of the present embodiment will be described. In the present embodiment, a process in the case of performing the servo continuous shooting in which continuous shooting of a still image, displaying of an image on the image display 213 and focus adjustment (AF) operation are performed in parallel during shooting will be described. When the user selects the servo continuous shooting mode by the shooting mode switch 215, the operation described below is performed.

FIG. 3 is a flowchart showing the flow of overall processing when the servo continuous shooting mode is selected. First, in step S10, AE processing is performed in the AE processor 211 based on the photometric value obtained by photometry. Note that in the first processing, AE processing may be performed based on the output of the image processor 203 obtained by performing pre-shooting using a predetermined exposure value, or a predetermined exposure value may be used as a substitute for a result of the AE processing. Next, in step S20, live view shooting for display an image on the image display 213 is performed, and the image is displayed in step S30. In step S40, the state of SW1 (217) is checked, and if it is ON, the process proceeds to step S50, and if it is OFF, the process returns to step S10 and the above processes are repeated.

In step S50, AF processing of detecting a focus state by performing focus detection by the on-imaging plane phase difference method, obtaining reliability, and controlling the focus lens 103 based on the obtained result is performed. The focus state detection method performed in this AF processing will be described later in detail.

In step S60, the state of SW2 (218) is checked, and if it is ON, the process proceeds to step S70, and if it is OFF, the process returns to step S10 and the above processes are repeated. At step S70, an operation of servo continuous shooting to be described later is executed, and the process returns to step S60. The above processes are repeated until the shooting mode switch 215 changes the shooting mode to a mode other than the servo continuous shooting mode or the process other than shooting such as playback is instructed by the operation unit 214.

Next, the flow of focus detection performed in the AF processing of step S50 in FIG. 3 will be described with reference to FIG. 4. First, in step S501, an arbitrary range of focus detection areas is set in the image sensor 201, and the process proceeds to step S502. In step S502, a pair of focus detection signals (A signal and B signal) is acquired from the image signal and a focus detection signal (A signal or B signal) read out from the focus detection area set in step S501 of the image sensor 201, and the process proceeds to step S503. In step S503, the pair of focus detection signals acquired in step S502 is subjected to vertical averaging processing in the vertical direction to obtain a pair of image signals (A image signal and B image signal) having parallax, and the process proceeds to step S504. This process can reduce the influence of noise on focus detection signals. In step S504, a filtering process is performed by a band pass filter for extracting signal components of a predetermined frequency band from the pair of image signals (A image signal and B image signal), and the process proceeds to step S505.

In step S505, correlation amounts of the pair of image signals filtered in step S504 are calculated, and in step S506, correlation change amounts are calculated from the correlation amounts calculated in step S505, and the process proceeds to step S507. In step S507, an image shift amount is calculated from the correlation change amounts calculated in step S506, and the process proceeds to step S508. In step S508, the image shift amount is converted into a defocus amount which is a shift amount of the focus lens, and the process proceeds to step S509. In step S509, reliability indicating the degree to which the defocus amount calculated in step S508 is reliable is obtained, and the focus detection processing is ended.

By driving the focus lens based on the defocus amount and the reliability obtained in this manner, the on-imaging plane phase difference AF can be performed. The control of the focus lens based on the defocus amount and the reliability can be performed using a known method, and thus the description thereof is omitted here.

(Calculation of Image Shift Amount)

Figure 5A:
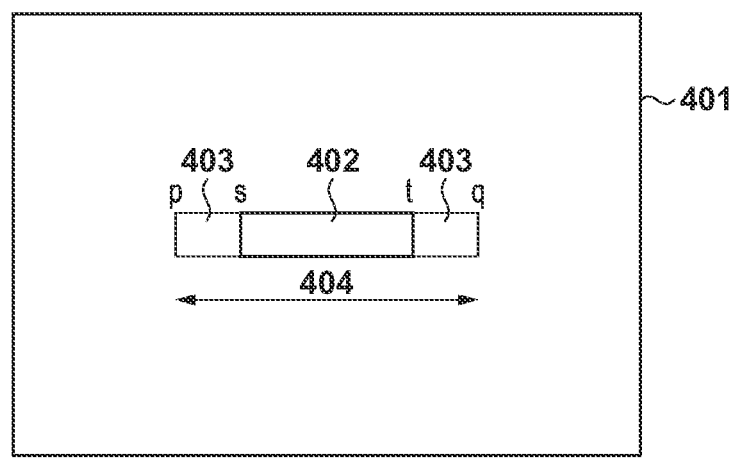
FIGS. 5A to 5D are diagrams showing an example of an AF area and image signals obtained from the AF area used in focus detection processing according to the embodiment.

Next, the method of calculating the image shift amount in the focus detection process described with reference to FIG. 4 will be described in more detail. FIG. 5A shows an example of a focus detection area 402 set on a pixel array 401 of the image sensor 201 in step S501 in the focus detection processing. Shift areas 403 on both sides of the focus detection area 402 are areas required for the correlation calculation. Therefore, an area 404 in which the focus detection area 402 and the shift areas 403 are combined is a horizontal pixel area required for the correlation calculation. In the figure, p, q, s, and t respectively represent coordinates in the horizontal direction (x-axis direction), and p and q respectively indicate the x coordinate of the start point and the end point of the pixel area 404, respectively, and s and t indicate the x coordinate of the start point and the end point of the focus detection area 402, respectively.

Figure 5B:
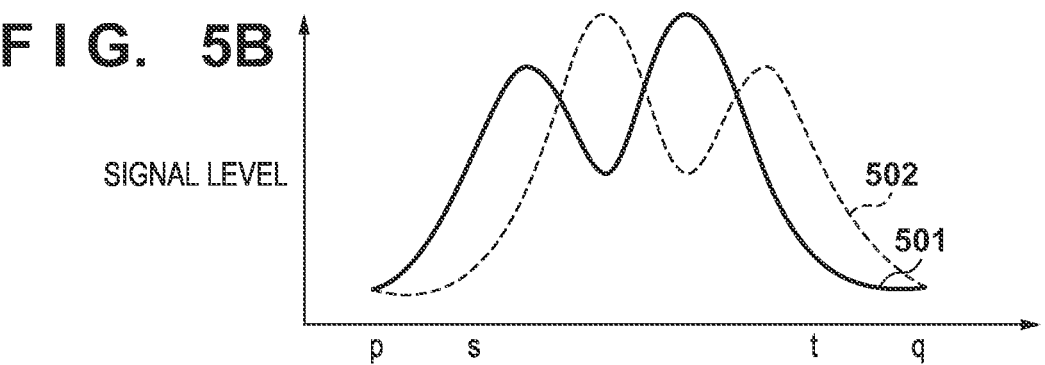
Figure 5C:
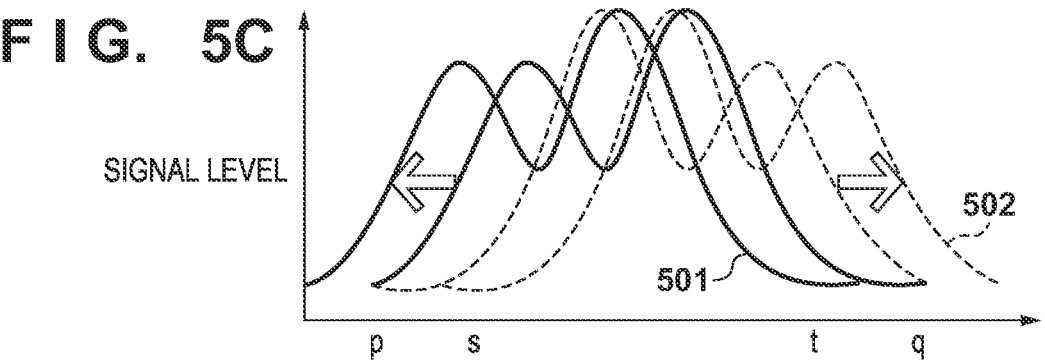
Figure 5D:
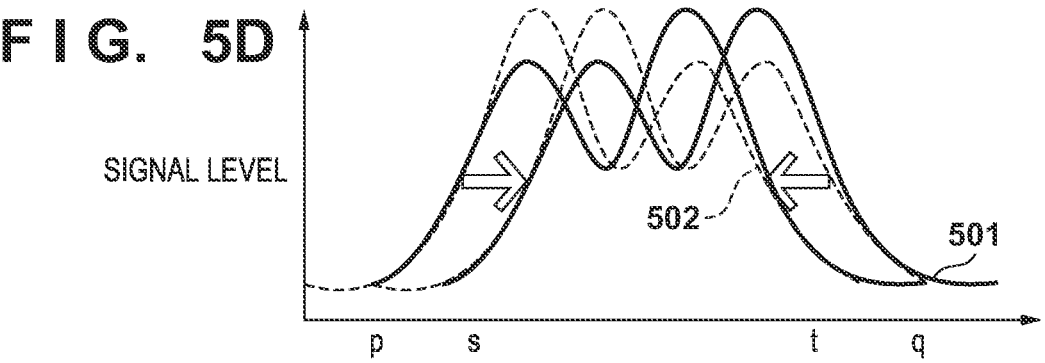

FIG. 5B shows an example of a pair of image signals for AF obtained based on signals acquired from a plurality of pixels included in the focus detection area 402 shown in FIG. 5A. A solid line 501 indicates an A image signal (one of the pair of image signals), and a broken line 502 indicates a B image signal (the other of the pair of image signals). FIG. 5B shows the A image signal 501 and the B image signal 502 before shifting, and FIGS. 5C and 5D show the A image signal 501 and the B image signal 502 shifted in the positive and negative directions, respectively, from the state of FIG. 5A for calculating the correlation amounts in step S505. In a case of calculating the correlation amounts between the pair of A image signal 501 and B image signal 502, both of the A image signal 501 and B image signal 502 are shifted by 1 bit in the direction of the arrow.

Here, a method of calculating the correlation amounts will be described. First, as shown in FIGS. 5C and 5D, the A image signal 501 and the B image signal 502 are shifted by one bit each, and in each shift state, a sum of absolute values of differences between the A image signal 501 and the B image signal 502 in the set focus detection area 402 (from s to t). Here, the maximum shift amount in the negative direction is p−s, and the maximum shift amount in the positive direction is q−t. Further, let the shift amount represented by I; x, the start coordinate of the focus detection area 402; and Y, the end coordinate of the focus detection area 402, then a correlation amount COR can be calculated by the following equation (1).

$$COR[i]=\Sigma_{k=x}^{y}|A[k+i]-B[k-i]|\{(p-s)<i<(q-t)\} \quad (1)$$

Figure 6A:
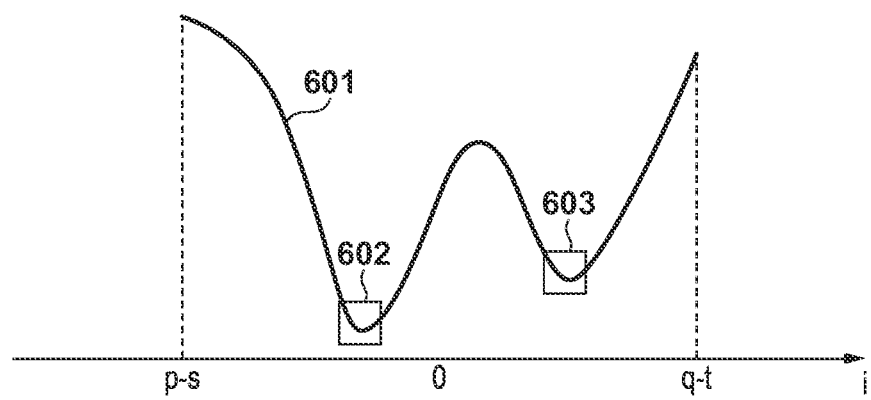
FIGS. 6A to 6C are diagrams showing relationship between a shift amount of the image signals shown in FIGS. 5A to 5D and the correlation amount and the correlation change amount.

FIG. 6A shows an example of the relationship between the shift amount and the correlation amount COR, where the horizontal axis indicates the shift amount and the vertical axis indicates the correlation amount COR. Among correlation amounts 602 and 603 around local minimums in the correlation amounts 601 that changes with the shift amount, the coincidence between the A image signal 501 and the B image signal 502 is the highest at the shift amount corresponding to the smaller correlation amount.

Next, the method of calculating the correlation change amounts performed in step S506 will be described. The differences between the correlation amount corresponding to shift amounts apart by one shift in the waveform of the correlation amounts 601 shown in FIG. 6A is calculated as a correlation change amount. Let the shift amount be i, since the maximum shift amount in the negative direction is p−s and the maximum shift amount in the positive direction is q−t, the correlation change amount ΔCOR can be calculated by the following equation (2).

$$\Delta COR[i]=\Delta COR[i-1]-\Delta COR[i+1]\{(p-s+1)<i<(q-t-1)\} \quad (2)$$

Figure 6B:
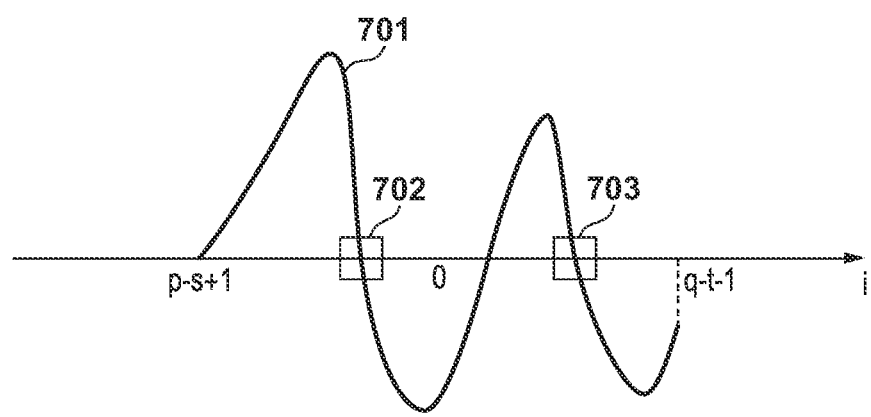

Next, the calculation method of the image shift amount performed in step S507 will be described. FIG. 6B shows an example of the relationship between the shift amount and the correlation change amount ΔCOR. The horizontal axis represents the shift amount, and the vertical axis represents the correlation change amount ΔCOR. The correlation change amounts 701 that changes with the shift amount goes from a positive value to a negative value at portions 702 and 703. The state in which the correlation change amount is zero is called zero crossing, and the degree of coincidence between the A image signal 501 and the B image signal 502 maximizes. Therefore, the shift amount giving the zero crossing is the image shift amount.

Figure 6C:
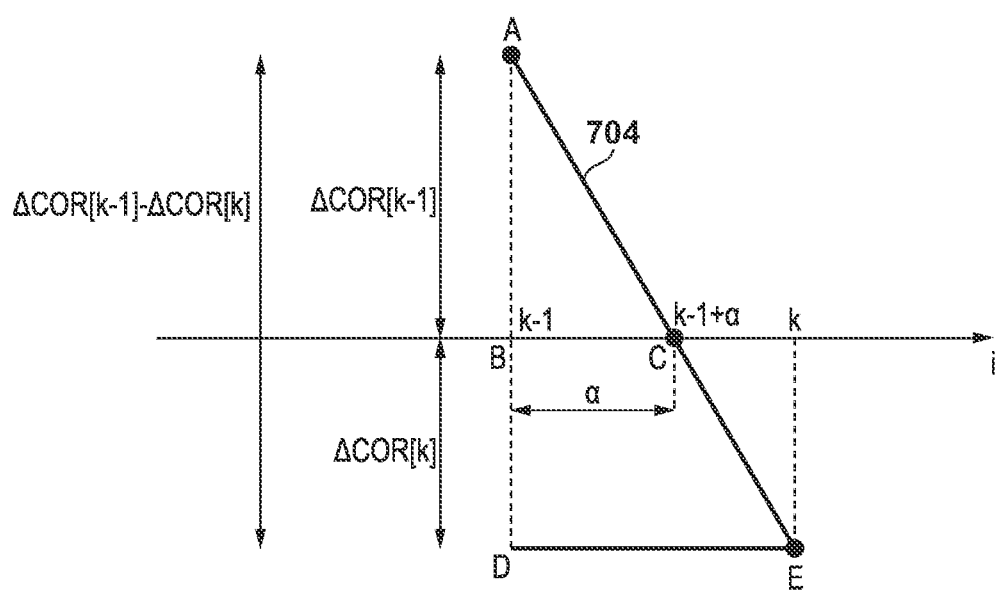

FIG. 6C is an enlarged view of a portion indicated by 702 in FIG. 6B, and 704 indicates a part of the correlation change amounts 701. A method of calculating the image shift amount PRD will be described with reference to FIG. 6C. First, the shift amount (k−1+α) giving zero crossing is divided into an integer part β (=k−1) and a fractional part α. The fractional part α can be calculated by the following equation (3) based on the similarity relationship between a triangle ABC and a triangle ADE in FIG. 6C.

$$AB:AD = BC:DE \quad (3)$$
$$\Delta COR[k-1]:\Delta COR[k-1] - \Delta COR[k] = \alpha:k - (k-1)$$
$$\alpha = \frac{\Delta COR[k-1]}{\Delta COR[k-1] - \Delta COR[k]}$$

On the other hand, the integer part β can be calculated by the following equation (4) as seen in FIG. 6C.

$$\beta = k-1 \quad (4)$$

The image shift amount PRD can be calculated from the sum of α and β obtained as described above.

Further, as seen in FIG. 6B, in a case where there are a plurality of zero crossings of the correlation change amount ΔCOR, the zero crossing having a larger steepness MAXDER of change in the vicinity of the zero crossing of the correlation change amount ΔCOR is set as the first zero crossing. The steepness is an index indicating the degree of easiness for specifying the in-focus position, and the larger the value, the easier it is to perform accurate AF. The steepness MAXDER can be calculated by the following equation (5).

$$\text{MAXDER} = |\Delta COR[k-1]| + |\Delta COR[k]| \quad (5)$$

As described above, in the present embodiment, when there are a plurality of zero crossings of the correlation change amount, the first zero crossing is determined by the steepness, and the shift amount giving the first zero crossing is determined as the image shift amount.

(Calculation of Reliability)

Figure 7:
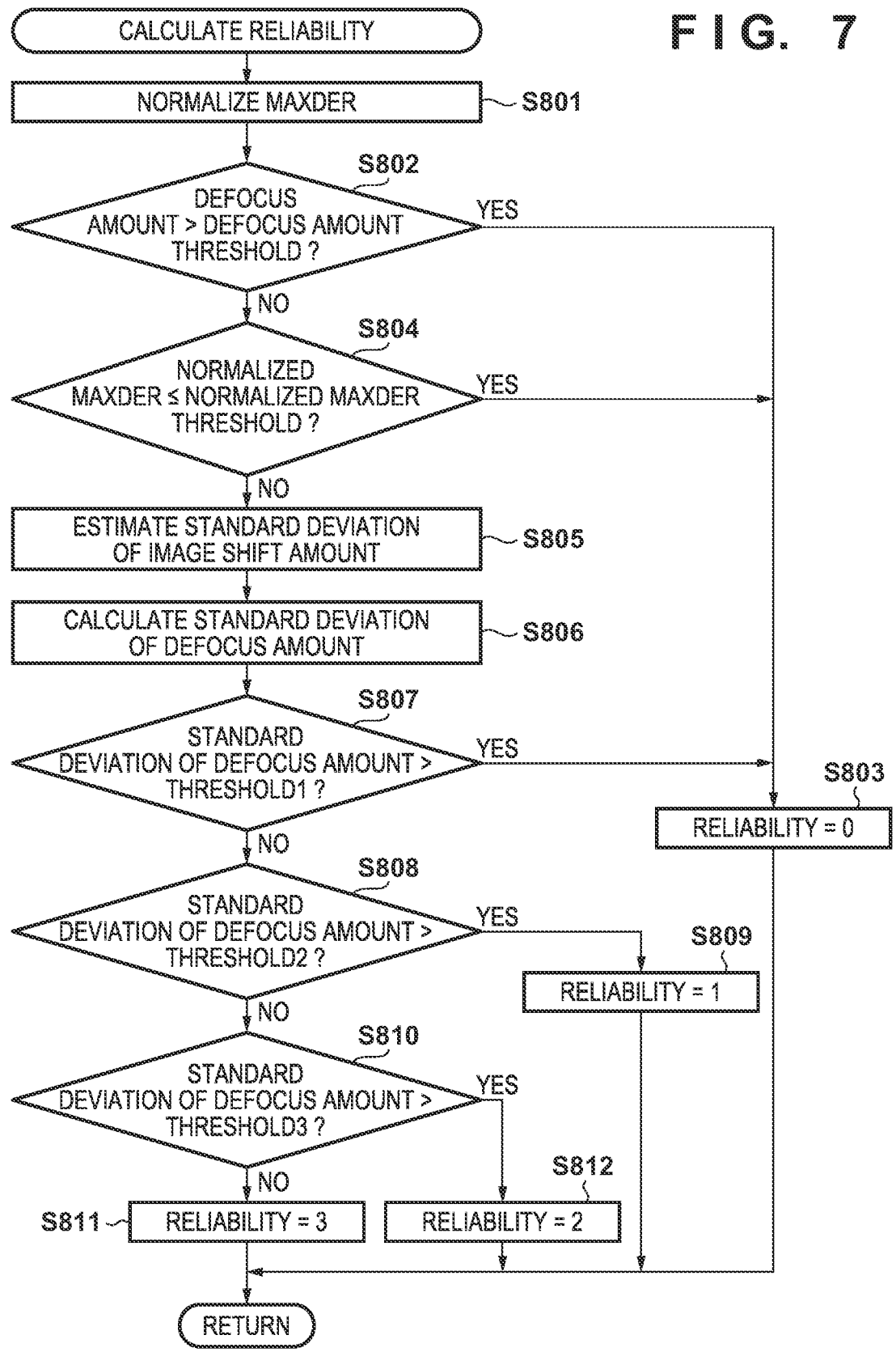
FIG. 7 is a flowchart showing reliability calculation processing according to the present embodiment.
Figure 8A:
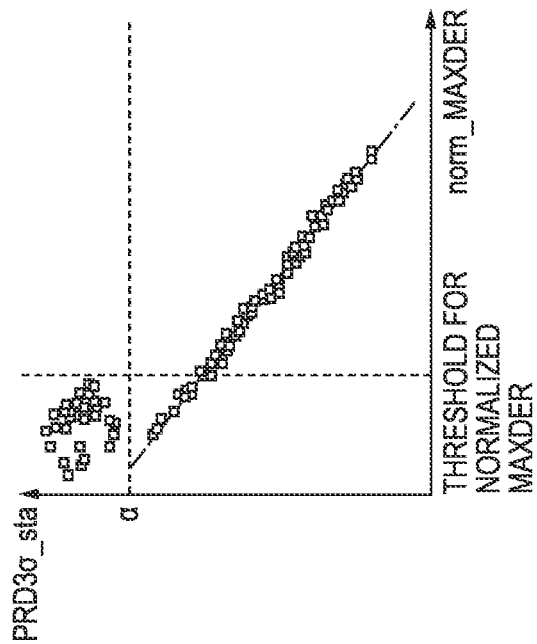
FIGS. 8A to 8C are diagrams showing relationship between steepness and the standard deviation of the image shift amount.
Figure 8B:
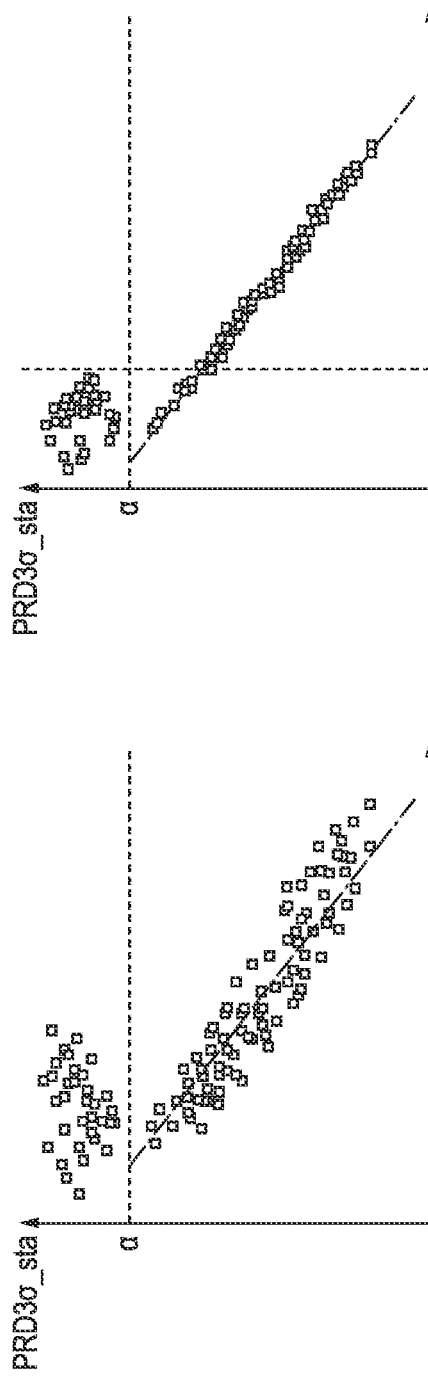
Figure 8C:
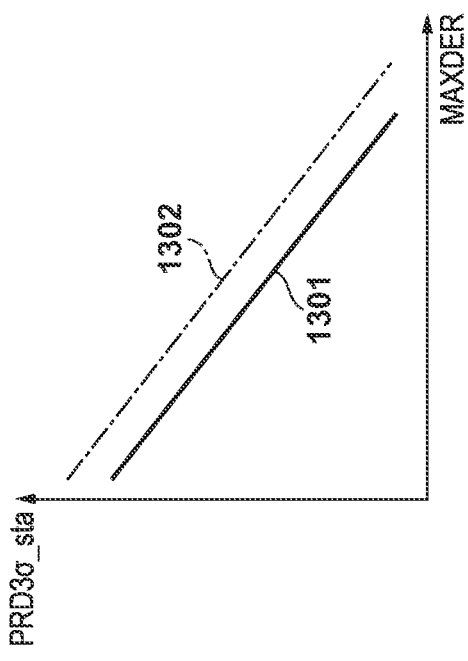

Next, the calculation process of the reliability performed in step S509 will be described with reference to the flowchart of FIG. 7. In the present embodiment, the reliability is evaluated in four stages. In step S801, the steepness MAXDER corresponding to the calculated image shift amount is normalized based on imaging conditions (sensor gain, addition number of read row, etc.) or subject conditions (contrast, etc.). In this embodiment, the steepness MAXDER is normalized according to the following four conditions, but the present invention is not limited to the following four conditions, and the steepness MAXDER may be normalized using to other conditions.

i. Sensor gain
ii. Number of rows to be averaged in vertical direction
iii. Number of added rows of correlation amount COR
iv. Contrast of subject Here, the principle of normalization will be described with reference to FIGS. 8A to 8C. In FIGS. 8A to 8C, the horizontal axis represents the steepness MAXDER on a logarithmic scale. The vertical axis represents the standard deviation of a plurality of image shift amounts on a logarithmic scale. The standard deviation (PRD3σ_sta), which is an evaluation value depending on the variation of the plurality of image shift amounts PRD, can be obtained by the following equation (6).

$$\text{PRD3}\sigma\_\text{sta} = \sqrt{\frac{1}{N}\sum_{i=1}^{N}(PRD_i - \overline{PRD})^2} \quad (6)$$

Further, each plotted point shown in FIG. 8A represents an average value of steepness MAXDER and the standard deviation of N image shift amounts when the image shift amount is measured N times without changing the conditions of shooting environment, subject, distance measurement settings (sensor gain, aperture, focus lens position etc.). Different plotted points represent the results obtained by measuring the image shift amount N times under different conditions. It can be seen from FIG. 8A that, in a region where the standard deviation PRD3σ_sta is smaller than α, there is a negative correlation in which the standard deviation PRD3σ_sta decreases as the steepness MAXDER increases. Therefore, in the region smaller than α, PRD3σ_sta can be estimated from the steepness MAXDER by using the correlation. However, since the relationship between the steepness MAXDER and the standard deviation PRD3σ_sta differs depending on distance measurement settings and subject, the negative correlation between the steepness MAXDER and the standard deviation PRD3σ_sta is not strong, and the estimation accuracy of PRD3σ_sta is low. Therefore, the steepness MAXDER is normalized according to the subject and the distance measurement settings by using the correlation shown in FIG. 8A so that the correlation coefficient between the steepness MAXDER and the standard deviation PRD3σ_sta approaches −1 as shown in FIG. 8B.

First, in "i. Normalization with sensor gain", the steepness MAXDER is normalized according to the sensor gain set by a CDS/AGC/AD converter. When the sensor gain is increased, the signal noise is also amplified together with the signal value, so that the detection variation of the image shift amounts in the correlation calculation becomes large. FIG. 8C is a graph using the same axes as in FIG. 8A and FIG. 8B, and shows an approximate line when data obtained under two different conditions are plotted. It is desirable to normalize the steepness MAXDER according to the amount of gain at which the SN ratio of the signal value changes, independent of the type of gain. Therefore, as shown in FIG. 8C, when the sensor gain is small, the steepness MAXDER is as shown by a line 1301, and when the sensor gain is large, the steepness MAXDER is as shown by a line 1302. In order to compensate for this difference, normalized steepness norm_MAXDER can be obtained by the following equation (7) using a coefficient $a_{gain}$ determined in accordance with the sensor gain.

$$\text{norm\_MAXDER}_{gain} = \text{MAXDER} \times a_{gain} \quad (7)$$

In "ii. Normalization according to number of rows to be averaged in vertical direction", the steepness MAXDER is normalized according to the value set in the vertical averaging in step S503. As described above, since the influence of signal noise can be reduced by increasing the number of rows in the vertical averaging, the detection variation of the image shift amount in the correlation calculation is reduced. Therefore, as shown in FIG. 8C, when the number of rows in the vertical averaging is large, the steepness MAXDER is as shown by the line 1301, and when the number of rows in the vertical averaging is small, the steepness MAXDER is as shown by the line 1302. Therefore, a normalized steepness norm_MAXDER can be obtained by the following equation (8) using the number of lines nLine in the vertical averaging and the coefficients $a_{line}$ and $b_{line}$.

$$\text{norm\_MAXDER}_{line} = \text{MAXDER} \times (a_{line} \times n\text{Line} + b_{line}) \quad (8)$$

In "iii. Normalization according to the number of added rows of correlation amount COR", the steepness MAXDER is normalized according to a set number of additions of the correlation amount COR. When the number of added rows of the correlation amount COR is large, the correlation change amount ΔCOR also becomes large, so the value of steepness MAXDER also becomes large. Therefore, as shown in FIG. 8C, when the number of added rows of the correlation amount COR is large, the steepness MAXDER is as shown by the line 1301, and when the number of added rows of the correlation amount COR is small, the steepness MAXDER is as shown by the line 1302. Accordingly, the normalized steepness norm_MAXDER can be obtained by the following equation (9) using the number of added rows nCOR of the correlation amount COR and the coefficients $a_{cor}$ and $b_{cor}$.

$$\text{norm\_MAXDER}_{cor} = \text{MAXDER} \times (a_{cor} \times n\text{COR} + b_{cor}) \quad (9)$$

In "iv. Normalization according to contrast of subject", the steepness MAXDER is normalized according to a subject contrast CNT. It is known that when the contrast of the subject is low, the detection variation of the image shift amount in the correlation calculation becomes large. Therefore, as shown in FIG. 8C, when the subject contrast is high, the steepness MAXDER is as shown by the line 1301, and when the subject contrast is low, the steepness MAXDER is as shown by the line 1302. Accordingly, normalized steepness norm_MAXDER can be obtained by the following equation (10) using the subject contrast CNT and the coefficients $a_{cnt}$ and $b_{cnt}$.

$$\text{norm\_MAXDER}_{cnt} = \text{MAXDER} \times (a_{cnt} \times \text{CNT} + b_{cnt}) \quad (10)$$

The coefficients used in the normalization operation of the steepness MAXDER according to the above four conditions are prepared in advance and stored in a memory or the like, and the normalization operation is sequentially performed as necessary. The order of performing the four normalization operations described above may be arbitrary. As described above, the change amount with respect to the relationship between the steepness MAXDER and the variation of the image shift amount is measured in advance for each element of each imaging condition, and conversion coefficients for converting the measured steepness MAXDER into a steepness MAXDER in a case where shooting is performed under a predetermined imaging condition are tabulated. The normalization operation is performed based on the conversion table.

The region where the standard deviation PRD3σ_sta of the image shift amount is larger than the boundary a is a region in which the standard deviation of the image shift amount is large and the reliability is low as the defocus amount. Therefore, as will be described later, the reliabilities of the environment, the subject, and the distance measurement settings plotted in this area are the lowest.

Next, in step S802, it is determined whether the defocus amount calculated in step S508 of FIG. 4 is larger than a set defocus amount threshold, and if it is larger than the defocus amount threshold, the process proceeds to step S803 and the reliability is set to 0.

If the defocus amount is less than the defocus amount threshold in step S802, the process proceeds to step S804, and it is determined whether the steepness norm_MAXDER normalized in step S801 is less than or equal to a normalized MAXDER threshold. If the normalized steepness norm_MAXDER is less than or equal to the normalized MAXDER threshold, the process proceeds to step S803 and the reliability is set to 0. It is known that the normalized steepness norm_MAXDER is small when a possibility of erroneous focus detection is high, such as when the luminance is low or when the contrast of the subject is low. This corresponds to a region where the standard deviation PRD3σ_sta is higher than the boundary α in FIG. 8B. Therefore, as shown in FIG. 8B, by setting the normalized MAXDER threshold, the reliability corresponding to the normalized steepness norm_MAXDER, which may often cause an error in focus detection, is set to 0.

If it is determined in step S804 that the normalized steepness norm_MAXDER is greater than the normalized MAXDER threshold, the process advances to step S805 to estimate the standard deviation of the image shift amount based on the normalized steepness norm_MAXDER. FIG. 8B is a graph showing the relationship between the normalized steepness norm_MAXDER and PRD3σ_sta. It can be seen that, comparing to the graph in FIG. 8A, there is a strong negative correlation in the graph in FIG. 8B. Therefore, an estimated standard deviation PRD3σ_est of the image shift amount can be calculated from the following equation (11) using the normalized steepness norm_MAXDER and the coefficients a and b calculated from the data measured in advance.

$$\text{PRD3}\sigma\_\text{est} = a \times \text{norm\_MAXDER}^b \quad (11)$$

Next, in step S806, a standard deviation of the defocus amount is estimated by multiplying the estimated standard deviation PRD3σ_est of the image shift amount estimated in step S805 by a predetermined conversion coefficient. The conversion coefficient used here is the same as the conversion coefficient used when converting the image shift amount to the defocus amount in step S508, and determined by the aperture value of the diaphragm/shutter 102, the exit pupil distance of the lens, the individual information of the image sensor 201, and the coordinates for setting the focus detection area. Further, the standard deviation of the defocus amount is also normalized by being divided by the aperture value F and the permissible circle of confusion δ.

The reliability of the defocus amount is evaluated according to the standard deviation of the defocus amount calculated as described above. In this embodiment, three thresholds (THRESHOLD1, THRESHOLD2, THRESHOLD3) are set for determining the standard deviation of the defocus amount. First, if the standard deviation of the defocus amount is larger than the threshold THRESHOLD1 in step S807, the process proceeds to step S803, and the reliability of the defocus amount is determined to be zero. If it is determined that the standard deviation of the defocus amount is less than or equal to the threshold THRESHOLD1 and greater than THRESHOLD2 (step S808), the process proceeds to step S809 and the reliability is evaluated as 1. If it is determined that the standard deviation of the defocus amount is less than the threshold THRESHOLD2 and greater than the threshold THRESHOLD3 (step S810), the process proceeds to step S812 and the reliability is evaluated as 2. If the standard deviation of the defocus amount is equal to or less than the threshold THRESHOLD3, the process proceeds to step S811 and the reliability is evaluated as 3.

If the reliability is evaluated based on the steepness MAXDER, it is necessary to set thresholds for the number of conversion coefficients. On the other hand, in the present embodiment, since the reliability is obtained based on the standard deviation of the standardized defocus amount, it is not necessary to hold a large amount of threshold data in the ROM 137. Further, since normalization is performed using the aperture value F, it is possible to set a threshold regardless of the state of the diaphragm/shutter 102.

In step S50 of FIG. 3, the AF control for driving the focus lens 103 is performed using the defocus amount and the reliability obtained in this manner.

Next, imaging processing and alternating display execution determination processing performed during servo continuous shooting in step S70 of FIG. 3 by the camera main body 200 according to the present embodiment will be described.

Figure 11:
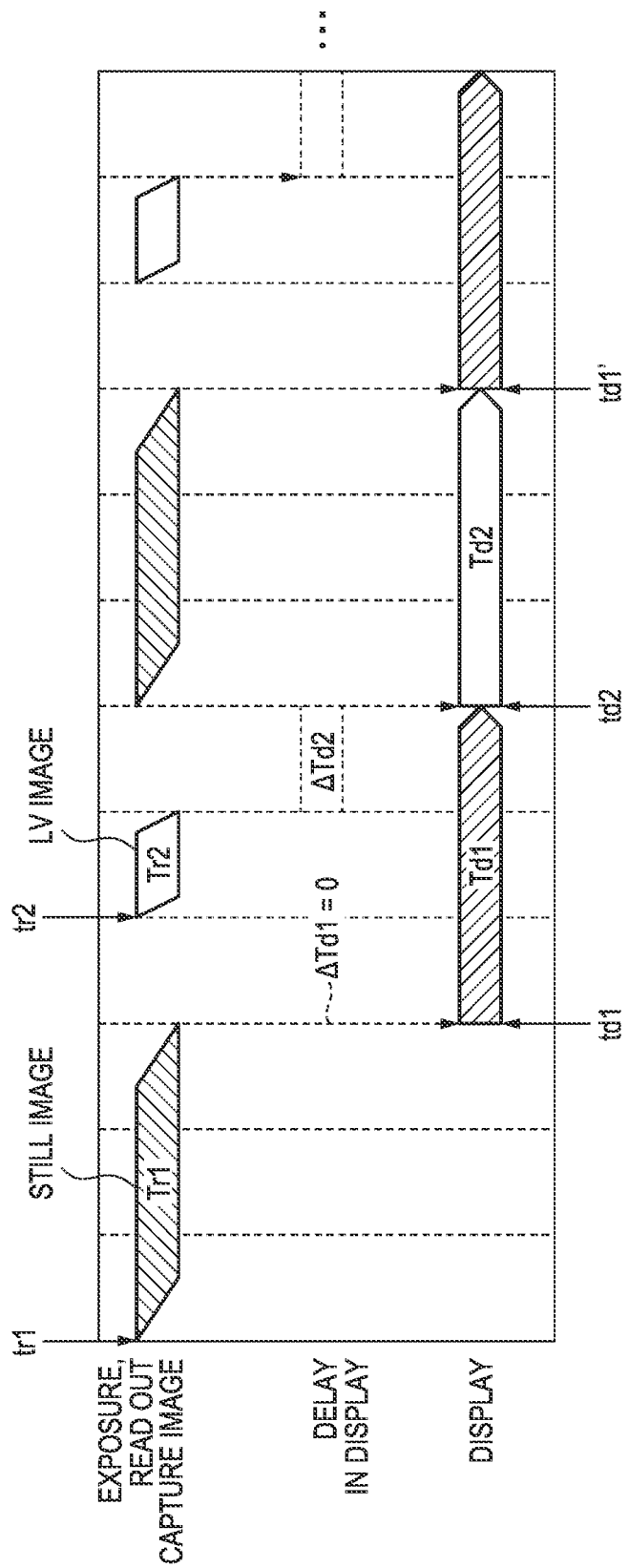
FIG. 11 is a timing chart of alternating display according to the first embodiment.

First, a specific timing in a case where a still image and an image used for AF and live view (hereinafter referred to as "display image") obtained by live view shooting between frames of the still image during servo continuous shooting are alternately displayed will be described using the timing chart of FIG. 11. In the present embodiment, it is assumed that live view shooting between frames of still images is shooting of one frame, and a low resolution display image and image data for AF are simultaneously acquired at the time of live view shooting. In FIG. 11, a first display delay time $\Delta Td1$ associated with the still image and a second display delay time $\Delta Td2$ associated with the display image are set such that a display time Td1 of the still image whose resolution is reduced according to the resolution of the image display 213 and a display time Td2 of the display image become equal. Specifically, the display delay is set only for the display image for which the acquisition time is short, without providing the display delay for the image obtained by still image shooting for which the acquisition time is long. That is, the first display delay time is $\Delta Td1=0$, and the display time of each image is controlled so that the display time Td1 of the still image for display and the display time Td2 of the display image become equal. Since the display timing adjustment is performed so that the display time Td1 of the still image for display and the display time Td2 of the display image are equal, continuous images without discomfort can be displayed.

First Embodiment

Figure 9:
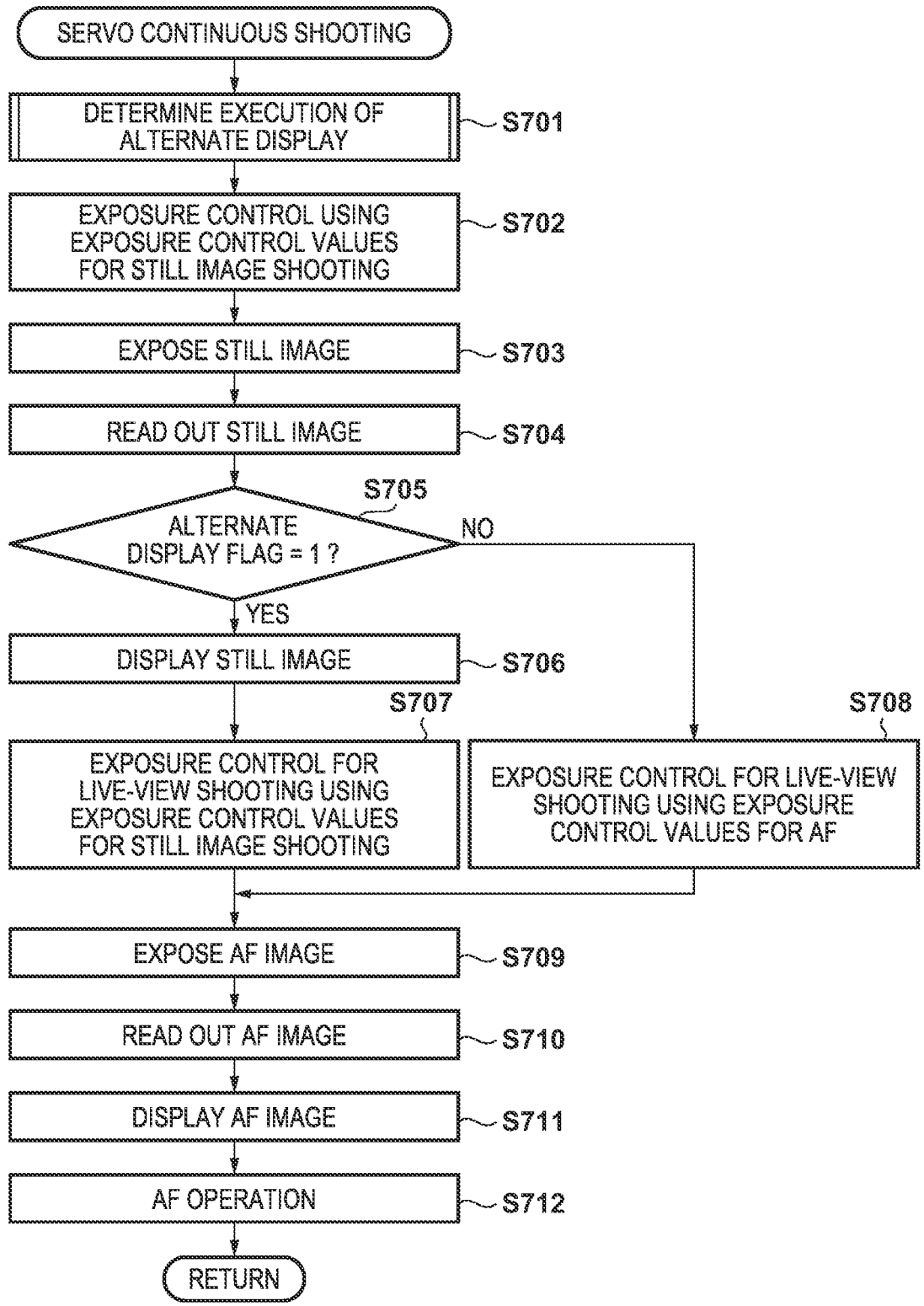
FIG. 9 is a flowchart showing the flow of servo continuous shooting according to a first embodiment.
Figure 10:
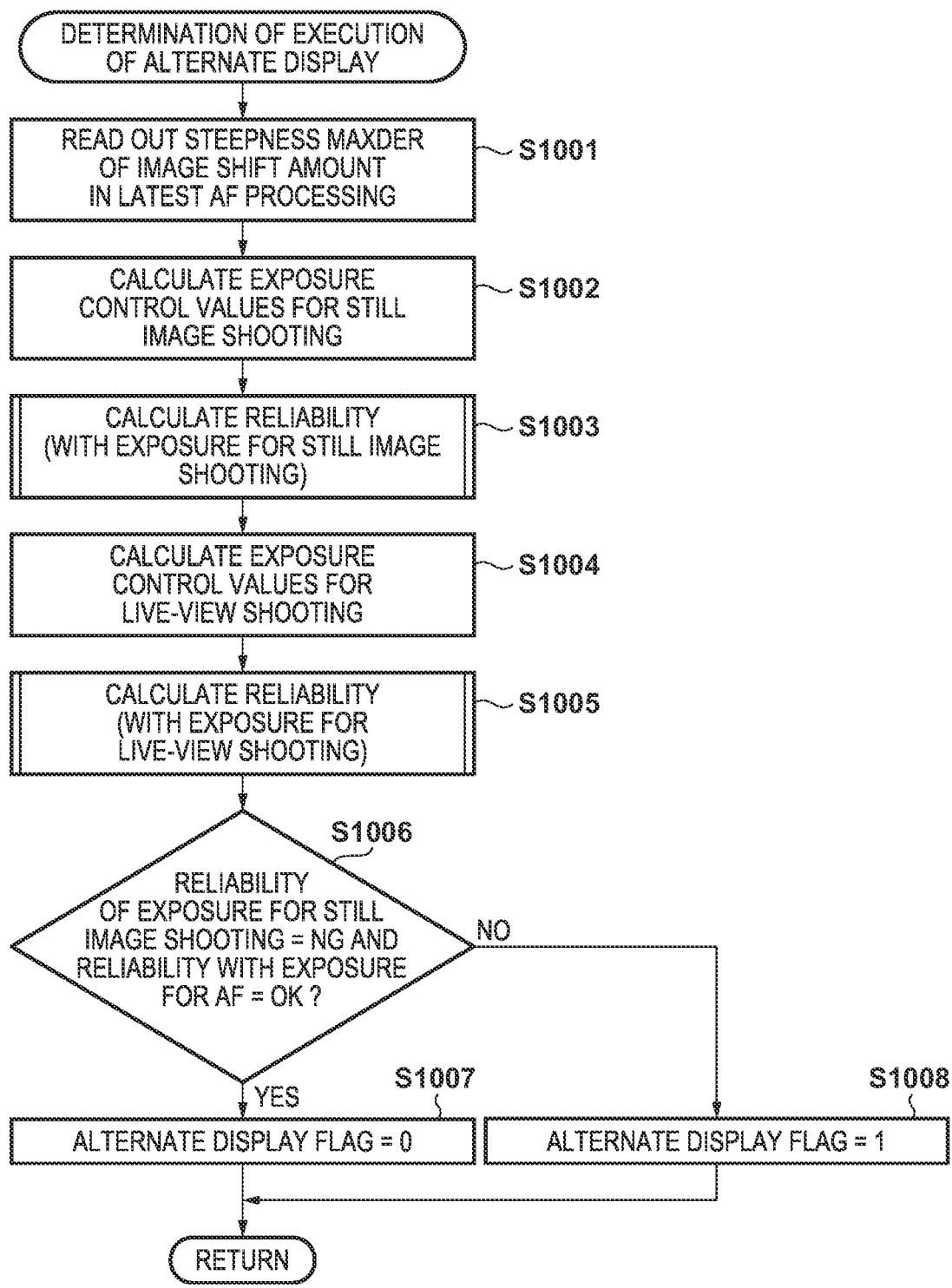
FIG. 10 is a flowchart showing alternating display execution determination processing according to the first embodiment.

Next, each exposure control for acquiring a still image a display image during servo continuous shooting will be described with reference to FIGS. 9 and 10. In the flowcharts of FIG. 9 and FIG. 10, the processing of each step is realized by communicating with the image sensor 201 and the lens apparatus 100 by the system controller 209 in the camera main body 200 unless otherwise specified.

When servo continuous shooting is started, the process proceeds to step S1001 in order to determine whether to execute alternating display in step S701. In the process of the flowchart of FIG. 10, it is determined whether the still image and the display image are alternately displayed. Whether to perform alternating display is equivalent to determining whether the performance of servo AF can be ensured when the exposure settings at the time of live view shooting between frames are equivalent to the exposure settings at the time of still image shooting. At that time, in live view shooting between frames of still image shooting, if the AF performance cannot be ensured even if exposure control is performed according to a program chart that is optimal for AF, exposure settings for still image shooting are set as exposure settings for live view shooting, and it is determined to continue alternating display. As a result, in a scene where focus detection is difficult, control is performed so that the followability of framing does not fall wastefully.

In step S1001, the steepness MAXDER calculated in the latest AF calculation is read out. In the subsequent step S1002, the AE processor 211 calculates an exposure control value optimal for still image shooting according to a program chart for still image shooting based on the photometric value. In step S1003, the reliability is calculated again using the exposure control value for still image shooting and the parameter used in the AF processing. At that time, it is possible to easily estimate the reliability of the AF result under different shooting conditions by using the exposure control value for the still image at the time of normalization of the steepness MAXDER. The method of calculating the reliability has been described above with reference to FIGS. 7 and 8A to 8C, and thus details thereof will be omitted here. By the process of step S1003, it is possible to estimate in advance the reliability when live view shooting is performed with the exposure control value for still image shooting. Note that the present embodiment is to estimate variation of the AF calculation result in a case where the exposure condition including the aperture changes, and when the defocus amount is large, the blurriness of the image greatly changes in each aperture, which may cause a large error in the steepness MAXDER with respect to the estimated value. Accordingly, it is necessary to use the steepness MAXDER acquired in the vicinity of the focus position, which has a relatively small amount of change due to vignetting of the aperture, in order to accurately perform the estimation operation corresponding to the aperture change. Therefore, the estimation accuracy can be enhanced as long as the steepness MAXDER acquired under in-focus state by the servo AF is used.

The above is an example of estimating the reliability in the case of performing live view shooting between frames using the exposure control values for still image shooting. Similarly, in steps S1004 and S1005, the reliability in the case of performing live view shooting between frames is estimated using the exposure control values based on the program chart for AF which is specialized for AF. In step S1004, the AE processor 211 calculates an exposure control value optimal for AF according to the program chart for AF based on the photometric value. In step S1005, the reliability is estimated again using the exposure control values for AF and the parameters at the time of AF calculation.

In step S1006, it is determined whether to perform alternating display using the reliability estimated in step S1003 and the reliability estimated in step S1005.

In a case where live view shooting between frames and still image shooting are performed using different exposure control values and the obtained still image and display image are alternately displayed, flicker and the like occur in the live view image displayed on the image display 213, and the image quality deteriorates. Therefore, if live view shooting between frames is performed using an exposure control values for AF, alternating display is automatically turned off and control is performed so as not to display a still image. However, when the alternating display is turned off, the followability of framing is degraded. Therefore, in view of the balance with the AF performance, it is determined that the alternating display is automatically turned off only when the reliability of the AF result obtained by using the exposure control values for still image shooting calculated in step S1003 is so low that distance measurement is not possible, and when the reliability obtained by using the exposure control values for AF calculated in step S1005 is sufficiently high. That is, the alternating display is turned off only in a case where improvement of the AF accuracy is expected by performing live view shooting between frames using the exposure control values for AF.

In the present embodiment, since the reliability is evaluated by 0 to 3, for example, in a case where the reliability estimated in step S1003 is 1 or less (equal to or less than a first reference), the alternating display is judged as NG, and if the degree of reliability estimated in step S1005 is 2 or more (equal to or greater than a second reference), the alternating display is determined as OK. However, the criteria used for the determination are not limited to these, and may be appropriately changed in consideration of, for example, at what stages the reliability is evaluated, the performance of the image display 213, and the like. Further, each parameter may be changed according to the shooting mode (auto, manual, moving image, etc.).

In a case where the alternating display is continued in step S1006, that is, the still image is also displayed as the live view image, the process proceeds to step S1008 and the alternating display flag is set to 1. Conversely, when the alternating display is stopped, that is, when the still image is not displayed, the process proceeds to step S1007, the alternating display flag is set to 0, and the process proceeds to the process of step S702 in FIG. 9.

In step S702, exposure control is performed using the exposure control values for still image shooting, and in the next step S703, the image sensor 201 is exposed, and in step S704 the still image is read out. In the subsequent step S705, it is determined whether the still image is displayed on the image display 213 according to the result of the determination of execution of alternating display in step S701. If the alternating display flag is 1 in step S705, the process advances to step S706 to display the still image read out in step S704 on the image display 213. In step S707, the exposure control values for live view shooting between frames is controlled using the exposure control values for still image shooting. On the other hand, if the alternating display flag is 0 in step S705, the still image is not displayed, and in the subsequent step S708, exposure of live view shooting between frames is controlled using the exposure control values for AF.

When the exposure control of live view shooting is completed in step S707 or S708, the display image is exposed in step S709, and the display image is read out in step S710. In step S711, the captured display image is displayed on the image display 213, and in step S712, an AF operation including focus detection processing is performed based on the display image. Since the focus detection process performed here is the same as the process mentioned above with reference to FIG. 4, description is omitted.

When the AF operation is completed, the process returns to FIG. 3, and it is determined in step S60 whether the continuous shooting instruction is continued. If the release button SW2 is released in step S60 and the continuous shooting is stopped, the servo continuous shooting is exited, the process proceeds to step S10, and enters the live view standby state.

As described above, according to the first embodiment, the reliability of the defocus amounts of the still image and the display image is estimated in a case where the exposure control values for still image shooting are used, and according to the result, an exposure control values to be used for displaying a live view image and capturing an image for display are determined. Thereby, it is possible to make the live view image easy to view while maintaining the accuracy of the AF control. In addition, this judgment may be performed by using the result of several estimation of reliability instead of using reliability estimated only once.

Note that in the first embodiment described above, on/off of the alternating display and exposure conditions for live view shooting between frames are selected by estimating reliability in a case where imaging is performed with different exposure conditions based on the steepness MAXDER which is an intermediate output at the time of performing the AF operation. In the estimation calculation of reliability under such different imaging conditions, not only the steepness MAXDER but also the evaluation value of contrast (signal amplitude and maximum value of image data) of image data for AF obtained at the time of focus detection, a correlation level of two images at the time of phase difference detection, and so forth, may be used. Further, the present invention is not limited to the above-described examples, and realized by using operation information capable of estimating reliability of focus detection according to the exposure conditions.

Second Embodiment

Next, a second embodiment of the present invention will be described. In the first embodiment described above, the AF calculation is performed based on the image data of focus detection pixels acquired at the time of live view shooting. On the other hand, in the second embodiment, the AF operation is performed based on image data of focus detection pixels read out during still image shooting, not limited to live view shooting.

Figure 12:
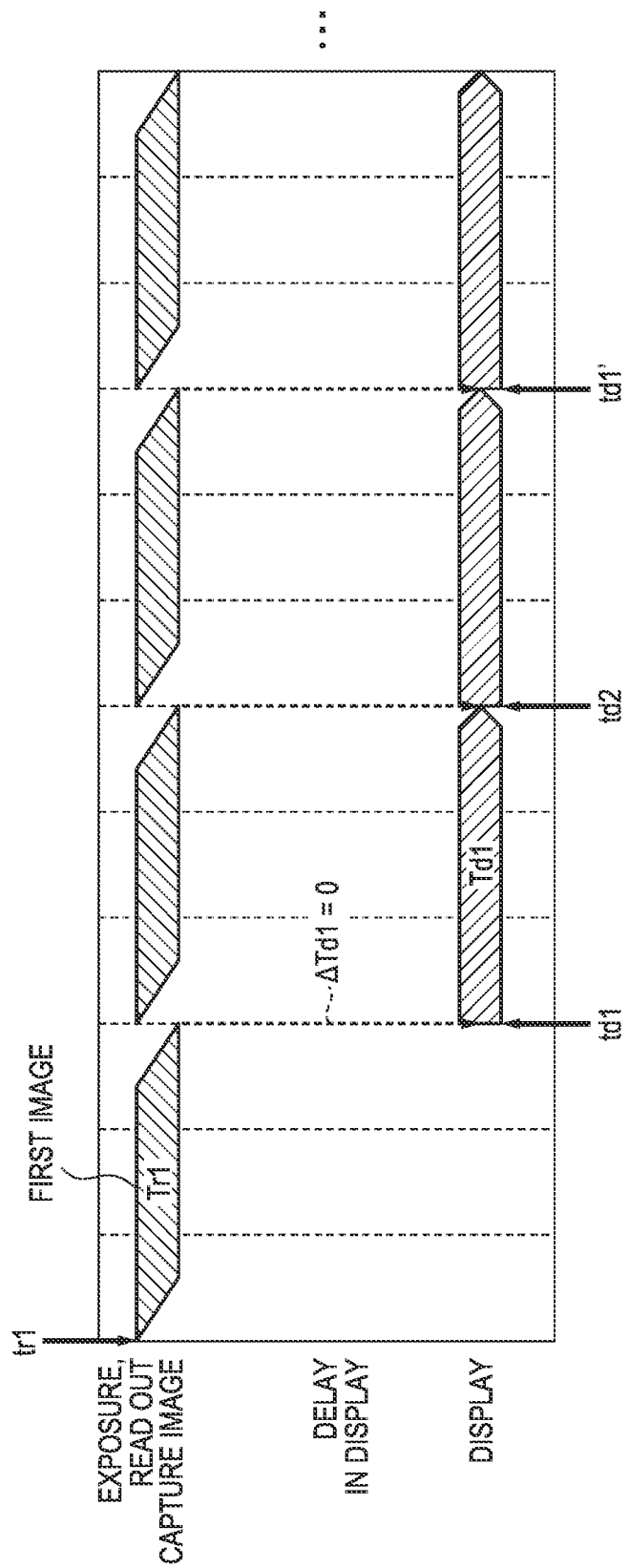
FIG. 12 is a timing chart of still image continuous shooting mode according to a second embodiment.

FIG. 12 is an example of a timing chart in a case where live view shooting is not performed between frames of still images and an output of focus detection pixels is also acquired at the time of still image shooting. In FIG. 12, at the time of still image shooting, a high resolution image is recorded, and an image for live view display and image data for AF are simultaneously acquired, and the display delay time of the still image $\Delta Td1=0$.

When servo continuous shooting is performed only for capturing still images, since AF is also performed with images captured using the exposure control values for a still image, there may be many scenes in which the reliability of focus detection is low. Accordingly, in a case where the reliability of the AF calculation using the still image is low and the sufficient AF performance cannot be maintained, as shown in FIG. 11, a shooting sequence is switched such that the display image is obtained by using exposure control values suitable for AF between frames of the still images, the decrease in AF performance is reduced. Alternatively, the shooting sequence may be switched according to a frame rate.

Figure 13:
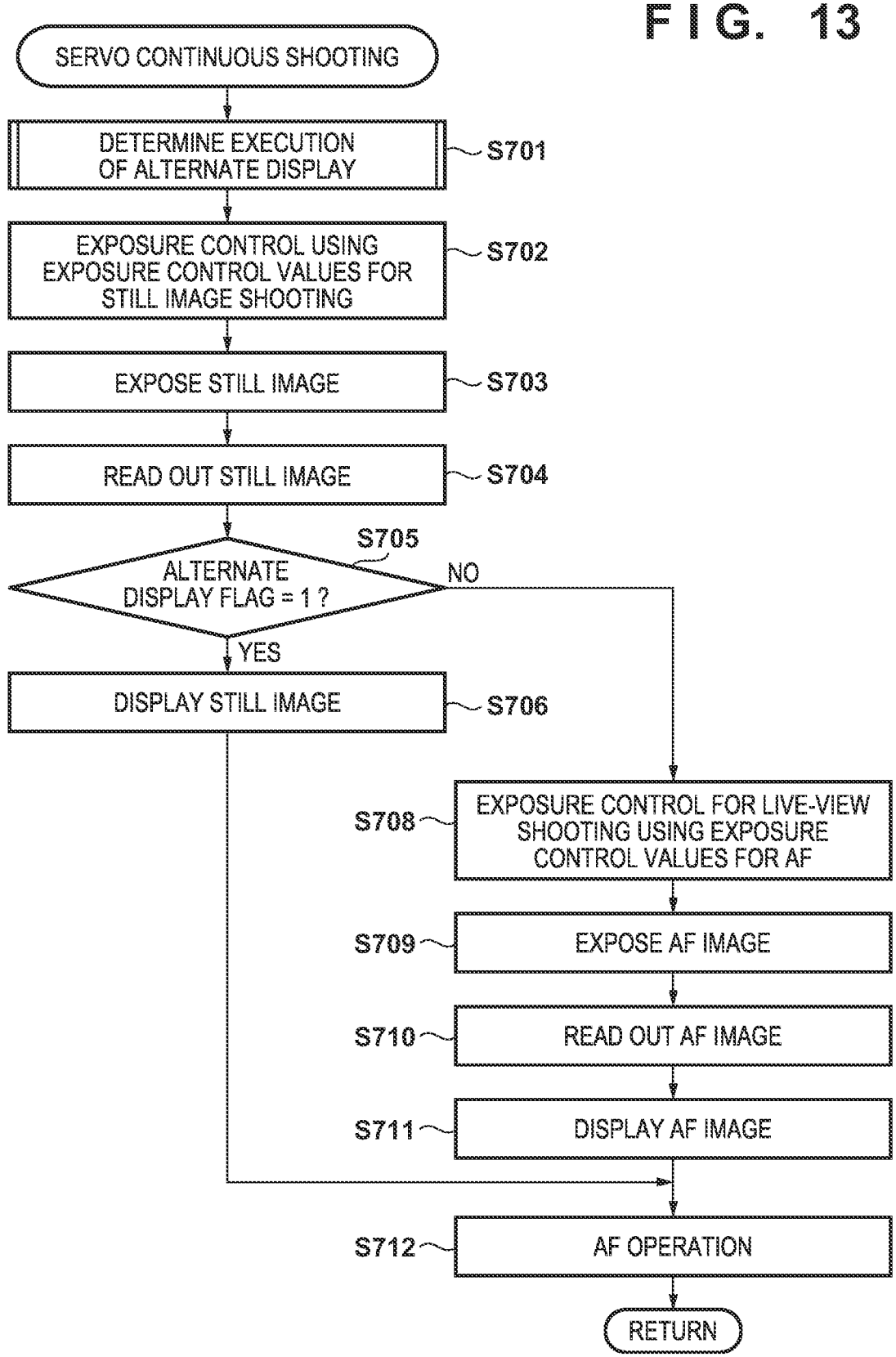
FIG. 13 is a flowchart showing a flow of the servo continuous shooting according to the second embodiment.
Figure 14:
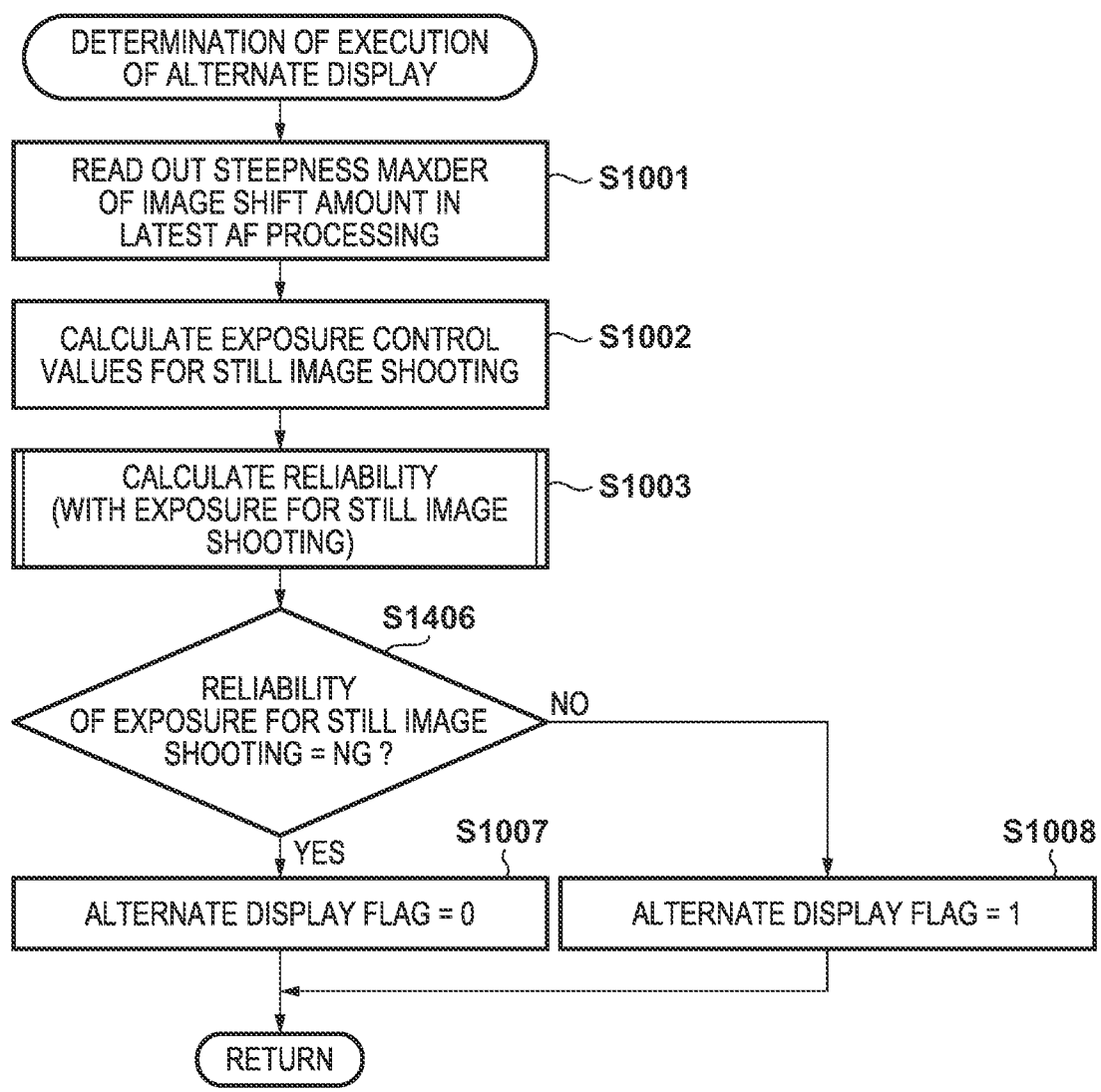
FIG. 14 is a flowchart showing alternating display execution determination processing according to the second embodiment.

FIG. 13 is a flowchart showing servo continuous shooting processing in the second embodiment, and FIG. 14 is a flowchart showing alternating display execution determination processing in the second embodiment. In FIG. 13 and FIG. 14, the same processes as those in FIG. 9 and FIG. 10 will be assigned the same reference numerals and descriptions thereof will be omitted as appropriate.

First, when servo continuous shooting is started, in step S701, the process proceeds to step S1001 in FIG. 14 in order to determine whether to perform alternating display. In step S1001, the steepness MAXDER calculated in the latest AF calculation is read out. In a case where the control shown in FIG. 12 is performed, the steepness MAXDER acquired at the time of still image shooting is obtained. Then, in step S1003, the reliability in the case where live view shooting is performed using the exposure control values for still image shooting is estimated based on the obtained steepness MAXDER.

Next, in step S1406, it is determined whether live view shooting is to be performed between frames based on the estimated reliability. If the reliability is low (for example, 1 or less), the alternating display is judged as NG, the alternating display flag is set to 0, and when the alternating display is not judged as NG, the alternating display flag is set to 1.

Returning to FIG. 13, when the alternating display flag is 1 in step S705, the still image is displayed in live view in step S706, and in step S712, the AF operation is performed based on the image data obtained from the focus detection pixels acquired at the time of still image shooting, and the process returns to the process of FIG. 3.

On the other hand, in step S705, when the alternating display flag is 0, display of a still image is not performed, live view shooting is performed in step S708 or later, and a display image is displayed as a live view image. In step S712, the AF operation is performed based on the image data of focus detection pixels acquired at the time of live view shooting, and the process returns to the process of FIG. 3.

As described above, when live view shooting is performed between frames of still images, a delay occurs due to shooting of a display image, AF calculation, and the like, so that the frame rate of still image shooting decreases. Therefore, by using the method according to the second embodiment in consideration of maintaining the frame rate and the accuracy of AF control, live view shooting is performed only when it is necessary for the accuracy of AF control, thereby reducing the effect of the live view shooting.

Although the present invention has been described in detail based on its preferred embodiments, the present invention is not limited to these specific embodiments, and various forms within the scope of the present invention are also included. The present invention is applicable not only to live view shooting between still image frames but also to stop live view shooting between still image frames.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-091405, filed on May 10, 2018 which is hereby incorporated by reference herein in its entirety.

What is claimed is:

1. An image capturing apparatus comprising one or more processors and/or circuitry which functions as:
a display that displays an image of signals output from an image sensor that includes a plurality of focus detection pixels capable of outputting a pair of signals having parallax; and
a display control unit that controls the display in a first mode in which a still image and a live view image are alternately displayed, and in a second mode in which a live view image is displayed and a still image is not displayed,
wherein the display control unit controls, in the first mode, exposures of the live view image and of the still image to be the same, and
wherein the display control unit controls, in the second mode, an exposure of the live view image to be different from that of the still image.

2. The image capturing apparatus according to claim 1, wherein a resolution of the live view image is lower than a resolution of the still image.

3. The image capturing apparatus according to claim 1, wherein the one or more processors and/or circuitry further functions as a detector that detects a focus state based on the pair of signals read out from the plurality of focus detecting pixels, the pair of signals also used for the live view image, and
wherein the display control unit controls the display in the second mode in a case where detecting accuracy of the focus state by the detector is insufficient if the exposure of the still image is used.

4. The image capturing apparatus according to claim 1, wherein the one or more processors and/or circuitry further functions as a detector that detects a focus state based on the pair of signals read out from the plurality of focus detecting pixels, the pair of signals also used for the live view image,
wherein the display control unit controls display in a second mode in a case where a quality of a displayed image deteriorates by alternately displaying the still image and the live view image.

5. The image capturing apparatus according to claim 1, wherein the display control unit controls the display so that a display time of the still image to be displayed and a display time of the live view image are the same in the first mode.

6. The image capturing apparatus according to claim 3, wherein the one or more processors and/or circuitry further functions as an estimator that estimates reliability of the focus state detected by the detector by normalizing an evaluation value obtained at a time of detecting the focus state by the detector using the pair of signals obtained with the same exposure as the still image.

7. The image capturing apparatus according to claim 6, wherein the detector detects the focus state based on correlation amounts of the pair of signals, and
the estimator estimates the reliability using an evaluation value that depends on variation of the correlation amounts.

8. The image capturing apparatus according to claim 7, wherein the estimator estimates a first reliability by normalizing the evaluation value obtained at a time of detecting the latest focus state using the exposure control value suitable for shooting the still image based on the result of photometry.

9. The image capturing apparatus according to claim 8, wherein the estimator further estimates a second reliability by normalizing the evaluation value obtained at a time of detecting the latest focus state using the exposure control value suitable for detecting the focus state based on the result of photometry.

10. The image capturing apparatus according to claim 9, wherein the determiner determines not to display the still image in a case where the first reliability is equal to or less than a first reference and the second reliability is equal to or greater than a second reference.

11. The image capturing apparatus according to claim 9, wherein the determiner determines not to display the still image in a case where the first reliability is equal to or less than a first reference.

12. The image capturing apparatus according to claim 6, wherein the estimator estimates a first reliability by normalizing at least one of contrast of the pair of signals and a correlation level using the exposure control value suitable for shooting the still image based on the result of photometry.

13. The image capturing apparatus according to claim 12, wherein the estimator further estimates a second reliability by normalizing at least one of contrast of the pair of signals and a correlation level using the exposure control value suitable for detecting the focus state set by the setter based on the result of photometry.

14. The image capturing apparatus according to claim 13, wherein the determiner determines not to display the still image in a case where the first reliability is equal to or less than a first reference and the second reliability is equal to or greater than a second reference.

15. The image capturing apparatus according to claim 13, wherein the determiner determines not to display the still image in a case where the first reliability is equal to or less than a first reference.

16. A control method of an image capturing apparatus, comprising:
displaying an image of signals output from an image sensor that includes a plurality of focus detection pixels capable of outputting a pair of signals having parallax, such that a still image and a live view image are alternately displayed in a first mode, and a live view image is displayed and a still image is not displayed in a second mode,
wherein exposures of the live view image and of the still image are the same in the first mode, and
wherein an exposure of the live view image is different from an exposure of the still image in the second mode.

17. The control method according to claim 16 further comprising:
in a case of continuously shooting still images while performing focus control, determining whether or not to display the still images on a display based on the reliability estimated by an estimator,
wherein, in a case where it is determined that the still images are not displayed,
controlling to shoot the live view image with a lower resolution than the still images between frames of the still images using an exposure control value suitable for detecting a focus state,
detecting the focus state based on the pair of signals read out from the plurality of focus detection pixels at a time of shooting the live view image, and
displaying the live view image for display on the display.

18. The control method according to claim 17, wherein, in a case where it is determined that the still images are displayed,
controlling to shoot the live view image between frames of the still images using an exposure control value suitable for shooting the still images,
detecting the focus state based on the pair of signals read out from the plurality of focus detection pixels at a time of shooting the live view image, and
the display displays the still images and the live view image.

19. The control method according to claim 17, wherein, in a case where it is determined that the still images are displayed,
detecting the focus state based on the pair of signals read out from the plurality of focus detection pixels at a time of shooting the still images, and
displaying the still images on the display.

20. A non-transitory storage medium readable by a computer, the storage medium storing a program that is executable by the computer, wherein the program includes program code for causing the computer to execute a control method of an image capturing apparatus, the method comprising:
displaying an image of signals output from an image sensor that includes a plurality of focus detection pixels capable of outputting a pair of signals having parallax, such that a still image and a live view image are alternately displayed in a first mode, and a live view image is displayed and a still image is not displayed in a second mode,
wherein exposures of the live view image and of the still image are the same in the first mode, and
wherein an exposure of the live view image is different from an exposure of the still image in the second mode.

* * * * *